United States Patent [19]
Thomsen

[11] 3,746,171
[45] July 17, 1973

[54] FILTER ASSEMBLY
[76] Inventor: Jack W. Thomsen, 921 North Street Ave., La Grange Park, Ill. 60525
[22] Filed: July 21, 1971
[21] Appl. No.: 164,820

Related U.S. Application Data
[63] Continuation of Ser. No. 831,030, June 6, 1969, abandoned.

[52] U.S. Cl.................. 210/234, 210/439, 210/440, 210/444, 210/447
[51] Int. Cl............................................. C02c 1/14
[58] Field of Search.................... 210/234, 439, 440, 210/444, 447, 445, 443; 55/508, 418, 478, 505, 312

[56] References Cited
UNITED STATES PATENTS
2,544,244  3/1951  Vokes................................ 210/234
2,568,181  9/1951  Zimmerman et al. .......... 210/451 X
2,804,211  8/1951  Kennedy.......................... 210/444 X
2,991,885  7/1961  Gutkowski...................... 210/234 X
3,262,570  7/1966  Gailitis et al..................... 210/444 X
3,399,776  9/1968  Knuth............................... 210/234
3,502,221  3/1970  Butterfield....................... 210/444

FOREIGN PATENTS OR APPLICATIONS
253,785  8/1964  Australia............................ 210/451
536,660  2/1957  Canada.............................. 210/439

Primary Examiner—Samih N. Zaharna
Assistant Examiner—F. F. Calvetti
Attorney—Frank R. Thienpont

[57] ABSTRACT

A filter assembly including a head having a built-in shut-off valve and adapted to be fixedly mounted in the line supplying the fluid to be filtered and a replaceable filter unit supported in a clamping collar which secures the filter unit to the head. Interacting cam means are provided on the clamping collar and head which functions to engage or disengage the filter unit to or from the head depending on the direction of rotation of the collar.

12 Claims, 6 Drawing Figures

Patented July 17, 1973
3,746,171
2 Sheets-Sheet 1
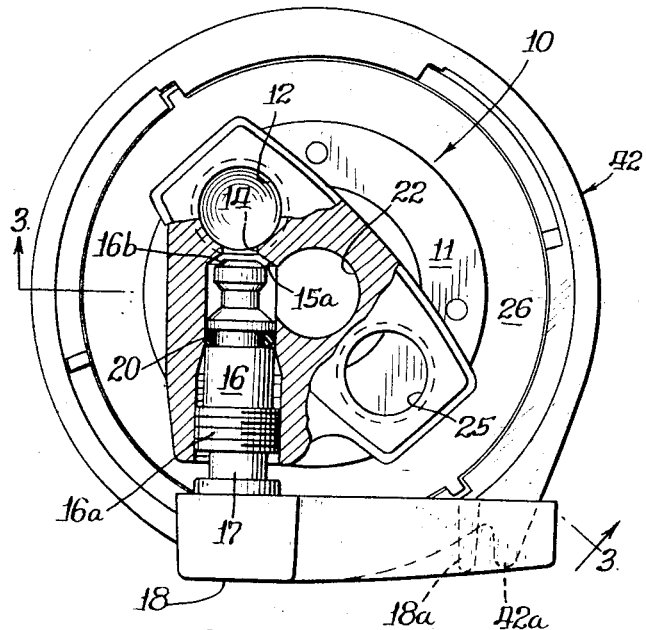
Fig. 1.
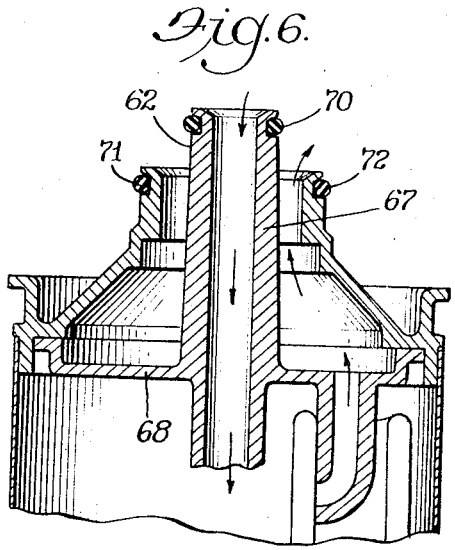
Fig. 6.
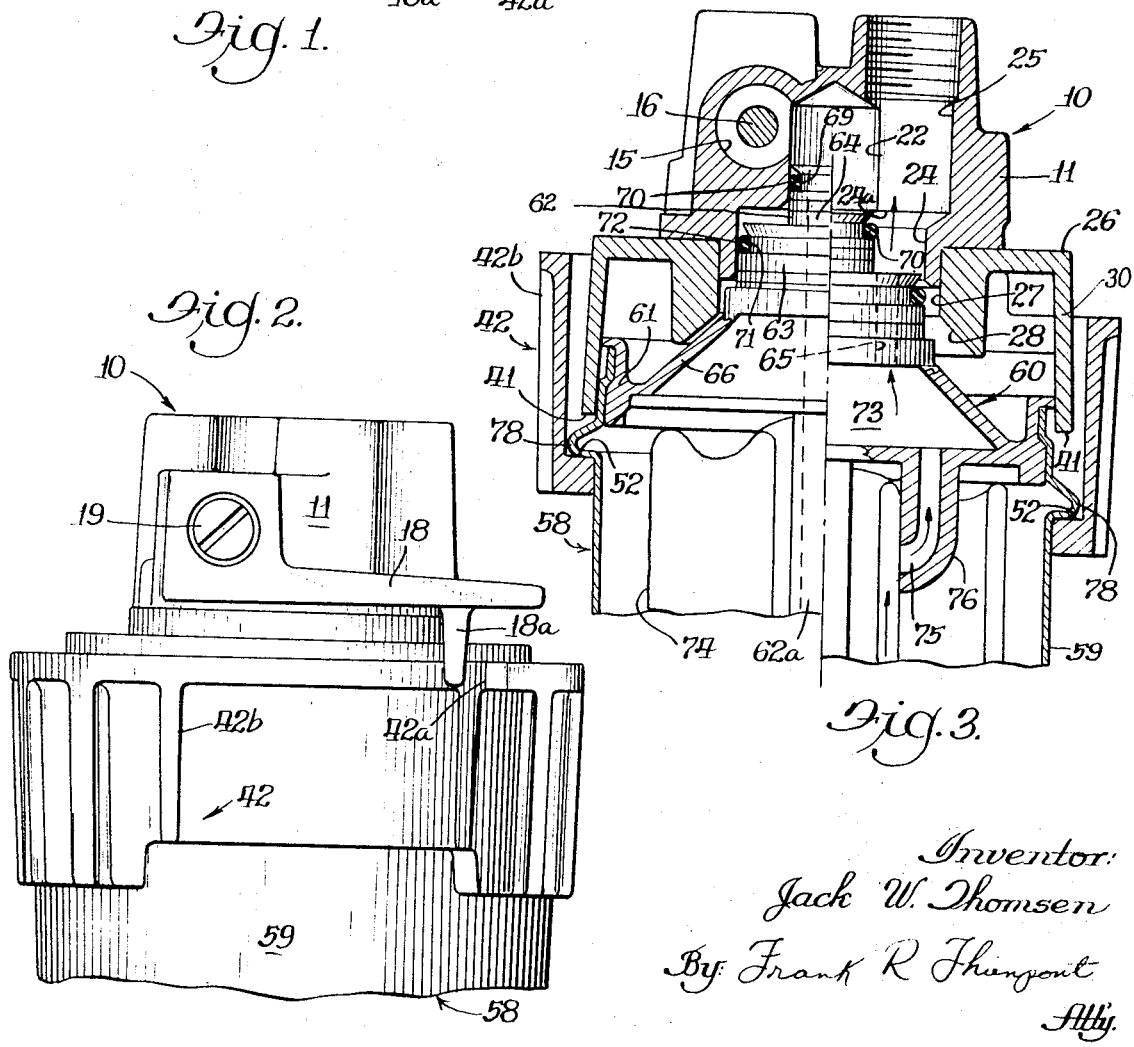
Fig. 2.
Fig. 3.
Inventor:
Jack W. Thomsen
By Frank R. Thurgood
Atty.

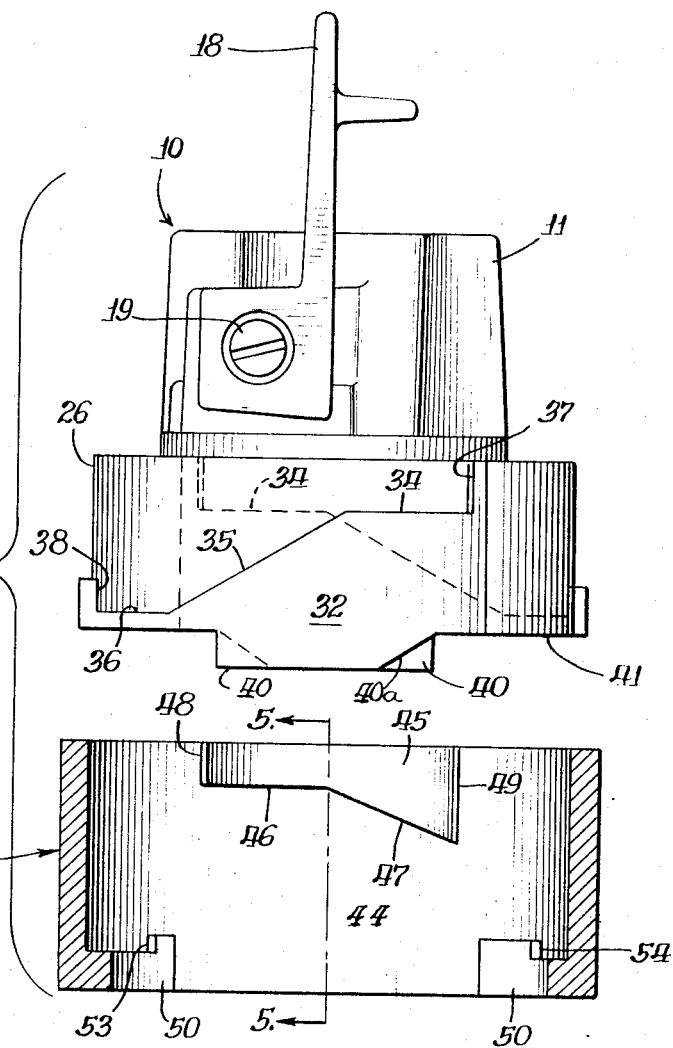
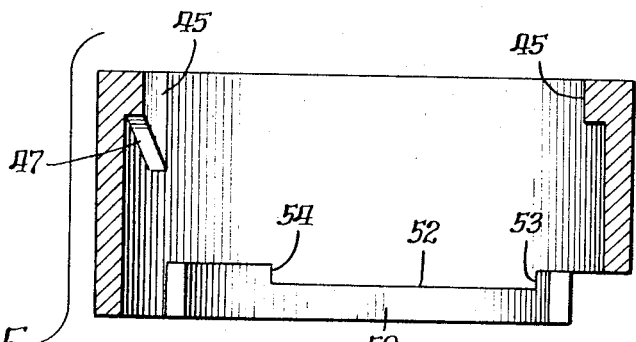
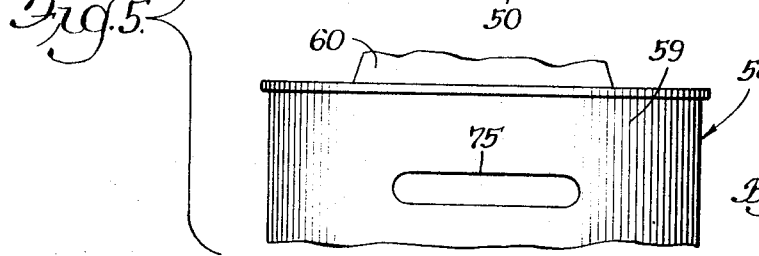

FILTER ASSEMBLY

This application is a continuation of application Ser. No. 831,030 filed June 6, 1969, now abandoned.

BACKGROUND OF THE INVENTION

The filter assembly of the present invention has particular, although not exclusive, application to beverage vending machines, such as coffee vending machines. These vending machines are provided with various forms of filter assemblies for filtering and purifying the water used to make the coffee. Such filter assemblies include cartridges which are replaced or replenished, depending on the particular type of cartridge, normally by a serviceman who services the vending machines on a need basis. In serving a typical one of these filter assemblies, the serviceman must first turn off the supply of water to the vending machine by means of a suitable valve which is usually located remotely from the vending machine. The serviceman opens the pressure vessel and then detaches the cartridge of the filter, usually by employing some kind of hand tools. The cartridge is replenished or recharged, as the case may be, and then connected again to the vending machine. In some situations a disposable cartridge unit may be provided, thereby obviating recharging by the servicemen. After a new or recharged cartridge is re-installed, the serviceman then turns on the supply of water.

This is a rather time consuming process requiring some degree of skill on the part of the serviceman and use of some form of hand tools. Further, this procedure often results in spillage of the liquid and the filter material requiring clean-up by the serviceman or other attendant. The present invention has to do with a new and improved filter assembly wherein the cartridge may be changed quickly and easily by a person of little or no skill and without using tools of any kind.

OBJECTS OF THE INVENTION

A primary object of the present invention is the provision of a new and improved filter assembly including a filter unit which may be quickly and easily removed and replaced without the use of tools.

Another object of the present invention is the provision of a new and improved filter assembly including a clamping collar engageable with a filter unit for drawing the filter unit into sealing engagement with a fixedly mounted head unit and for permitting expeditious separation of the filter unit from the head unit.

Still another object of the present invention is the provision of a new and improved filter assembly including a head, adapted to be fixedly mounted, a clamping collar and filter unit including a pressure vessel and a filter element, these parts uniquely cooperating with each other such that the seal between the filter unit and the head must be broken before the pressure vessel can be removed thereby preventing fluid under pressure in the system from blowing the pressure vessel from the head in the event removal of the same is attempted without shutting off the supply of fluid to the head.

Another object of the present invention is the provision of a new and improved filter assembly according to the foregoing objects wherein the head unit includes a shut-off valve with a manually operated actuating lever and a safety feature comprising cooperating formations on the lever and the collar to prevent movement of the latter to its unclamped position when the shut-off valve is in its open position.

Another object of the invention is the provision of a new and improved filter assembly having inlet and outlet ports which uniquely cooperate with inlet and outlet openings in a detachable filter unit.

Yet another object of the present invention is the provision of a filter assembly of the type described, which assembly is of simple construction and contains a minimum number of parts.

Briefly summarized, the filter assembly of the invention includes a head having a built-in shut-off valve and adapted to be fixedly mounted in the line supplying the fluid to be filtered and a replaceable filter unit attached to the head by a clamping collar which engages the head and supports the filter unit. Uniquely cooperating inlets and outlets in the head and filter unit accommodate fluid flow through the filter. Interacting cam means are provided on the head and clamping collar whereby the clamping collar may be rotated in one direction to a clamping position and in so doing bring the filter unit into sealing engagement with the head. The clamping collar is rotated in the opposite direction to disengage the filter unit from the head. The assembly also includes safety features which prevent unclamping the collar as long as the shut-off valve is completely open. Another safety feature prevents the filter unit from being blown from the head while the former is being disengaged from the latter if fluid pressure is still being exerted.

The above objects and advantages of the invention will become apparent when considered in conjunction with the accompanying drawings.

DESCRIPTION OF THE DRAWINGS

FIG. 1 is a top plan view of a filter assembly in accordance with the present invention, with certain parts being broken away and shown in section for better illustration;

FIG. 2 is a fragmentary side elevational view of the filter assembly;

FIG. 3 is a composite section taken along the line 3—3 of FIG. 1 showing the clamping collar and the filter unit in the clamped position in the left hand portion of the FIG. and in the unclamped position in the right hand portion of the FIG.;

FIG. 4 is an exploded, partial side elevation and partial section of the head member and the clamping collar;

FIG. 5 is a section taken along the line 5—5 of FIG. 4, and including a fragmentary side elevational view of the upper portion of the filter unit; and FIG. 6 is a sectional view in elevation of a modified form of closure member.

DETAILED DESCRIPTION

A head member, generally designated 10, is preferably made of metal construction and includes a first part 11 having an internally threaded inlet port 12 which communicates with a cross-bore 14, the latter being in coaxial communication with an enlarged bore 15. A valve stem 16 has a threaded portion 16a in threading engagement with internal threads in the bore 15. The valve stem includes an extension 17 connected to one end of a manual actuating lever 18, this connection being effected by a fastener 19. The valve stem 16 is in sealing engagement with the bore 15 by means of an O- ring 20. The valve has a frusto-conical portion 16b for sealing engagement with a valve seat 15a. When the actuating lever 18 is in its horizontal or open position illustrated in FIGS. 1 and 2, the portion 16b is unseated permitting communication between the inlet port 12 and a centrally disposed inlet port defined by bore 22 which intersects the bore 15. The lead of the thread 16a is such that when the lever 18 is moved to the vertical or shut-off position illustrated in FIG. 4, the valve portion 16b is seated against the surface 15a.

The bore 22 opens into a central recess or bore 24 which defines a downwardly facing shoulder 24a. Bore 24 is coaxially disposed with respect to bore 22. The part 11 includes an outlet port 25 which is internally threaded at the upper end thereof and which has its lower end opening at the shoulder 24a and thereby being in communication with the bore 24. It will be understood that the inlet port 12 and outlet port 25 are adapted for threading engagement with suitable fittings for connecting such ports with inlet and outlet conduits or tubes forming part of the associated apparatus, such as a coffee vending machine, for example. The head 10 may be fixedly mounted by a suitable bracket (not shown).

The head as here shown also includes a second part 26 having a central bore 27 communicating with a frusto-conical bore portion 28. The part 26 includes an integral, generally cylindrical skirt portion 30. This skirt portion includes integral, identical formations 32 formed on the outside of the skirt 30 and which are diametrically oppositely disposed in the relation illustrated in FIG. 4. The part 26 may be formed integrally with the first part 11 or separately and then attached to part 11 by suitable fastening means.

Each formation 32 has an arcuate, generally horizontally disposed cam surface 34, a helical or inclined cam surface 35 and another arcuate, generally horizontally disposed cam surface 36. The cam surface 34 joins with a cam stop surface 37. In like manner, the cam surface 36 joins with a cam stop surface 38. The lower edge of the skirt 30 includes a pair of identical, diametrically oppositely disposed formations 40 depending from the lower edge of the skirt and each defining a cam surface 40a. These formations separate a pair of generally diametrically oppositely disposed arcuate lower edge surfaces 41, the latter being contained in a common horizontal place.

A locking ring or clamping collar, generally designated 42, includes a sleeve-like member 44 having internal, diametrically oppositely disposed formations 45 which are identical, and which are arranged for cooperating with respective formations 32. Each formation 45 is formed at the upper edge of the collar 42 and includes a generally horizontally disposed downwardly facing cam surface 46 joining with an inclined or helical cam surface 47. The formation 45 also includes end surfaces or stops 48 and 49.

Arranged intermediate the formations 45 but at the opposite lower edge of collar 42 are a pair of internal ledge formations 50, the latter being identical and arranged such that they are disposed 180° from each other. Each ledge 50 has an arcuate, generally horizontally disposed recess surface 52, opposite ends of the latter joining with stop surfaces 53 and 54.

The clamping collar 42 is rotatably mounted on the part 26 of the head with the cam surfaces on the formations 32 in respective engagement with the cam surfaces on the formations 45. When the collar 42 is in the clamped position illustrated in FIG. 1, the cam surfaces 34 and 35 are coextensively engaged with respective cam surfaces 46 and 47, and with stop surfaces 37 and 48 in abutting engagement. Rotation of the collar 42 in a clockwise direction (FIG. 1) causes separation of the cam surfaces 35 and 47 and the stop surfaces 37 and 48. This rotation also causes sliding engagement between the cam surfaces 34 and 46 until the end of the cam surfaces 46 engage the cam surfaces 35 whereupon the collar 42 will commence moving axially or downwardly to its unclamped position. The limit of rotation of the ring 42 in a clockwise direction, i.e., to its fully unclamped position, is determined by the stops 49 on the collar 42 engaging the cam stops 38 on the part 26.

The filter assembly of the present invention in its preferred form includes a filter unit or cartridge, generally designated 58, which unit comprises a pressure vessel in the form of a generally cylindrical body 59 preferably of metal construction. The pressure vessel 59 is closed at the lower end thereof, the other end being closed by a sealing cap or closure member 60 which may be of metal or plastic construction.

The closure cap member 60 is of a generally conical shape being formed with a rim portion 61 at the base end, a relatively smaller annular portion or boss 62 and a relatively larger annular portion or boss 63. The upper end of the vessel 59 is crimped into place on the rim of the closure member 60 to form a tight seal therewith. The two annular portions and the rim portion are coaxially disposed. The annular portion 62 defines an opening 64 therethrough which communicates with bore 22 and port 12 which in this embodiment is the inlet port. The opening 64 admits liquid to the interior of the pressure vessel through the tubular extension 62a of annular portion 62. The annular portion 63 is coaxially disposed with the annular portion 62 and defines an opening in the form of bore 65 therethrough which lies outside of annular portion 62 and communicates with bore 24 and port 25 which in this embodiment is the outlet port.

A web portion 66 connects the rim portion 61 with the annular portion 63. The first annular portion 62 also may be the upper portion of a tube 67 supported by a web portion 68 connected to closure member 60 as shown in FIG. 6. The opening 65 then would be the entire space between the outer periphery of tube 67 and the inner periphery of the second annular portion 63 which in effect is a tube-like extension of web portion 66.

Since the upper end of the annular portion 62 or tube 67 is inserted in the bore 22 in sealing relation therewith a sealing means is provided. To do this, preferably the annular portion 62 or tube 67 includes an annular recess 69 for supporting an O-ring 70 thereby to form a seal with the bore 22. The annular portion 63 is provided in a similar manner with an annular recess 71 for supporting an O-ring 72 which forms a seal with the bore 24 in the part 11.

The arrangement of the ports in the closure member is particularly advantageous because only a very small area is available on which back pressure can act. Thus the total force that is exerted on the pressure vessel when the latter is disengaged is minimized and also the force that is exerted to disengage the pressure vessel seals from the head member as hereinafter discussed is minimized.

The vessel 59 contains a filter element such, for example, as a folded filter bag 74 which may be of the type shown in Oliver U.S. Pat. No. 3,055,503, assigned to the assignee hereof. The liquid in the vessel 59 is filtered and it passes to the interior of the filter bag 74. Fluid within the bag discharges through an opening 75 formed in a member 76 which is integral with the closure member 60. Filtered liquid passing through the opening 75 is admitted to a chamber 77 formed in the closure member, this chamber being placed in communication with outlet port 25 by means of the bore or opening 65 formed in the portion 63 of the closure member. It will be understood that the filter element within the vessel 59 may be of any suitable construction. The filter elements may include a dosing or treating vessel as shown in Jasionowski application, Ser. No. 440,831, filed Mar. 18, 1965, and assigned to the assignee of this application.

The pressure vessel 59 includes a pair of diametrically oppositely disposed, integral ridge surfaces or formations 78. These formations extend outwardly and are adapted to be received in respective recesses 52 formed in the ledges 50 for supporting the filter unit 58 in the collar 42.

According to the preferred embodiment shown for purposes of illustration, it is intended that the entire filter unit 58 will be disposable. However, it is within the scope of the invention to provide a re-usable pressure vessel similar to the vessel 59. The vessel 59 then could have disposed therein a replaceable filter element with a closure member 60 attached to the filter element as an integral part thereof. On the other hand, the pressure vessel, closure member and filter element could comprise three separate parts put together as an assembled unit and in which only the filter element would be replaced. In such construction the closure member 60 would be detachably secured in the upper part of the pressure vessel.

It is particularly advantageous, however, to use a disposable type filter unit such as is contemplated by the unit 58. It will be appreciated that the process of changing this type of filter unit is a completely sanitary one because no handling of the filter element is required, and the filter element is never exposed. In the case of filtering water for use in vending machines, for example, this aspect of complete sanitation is obviously a great advantage.

The operation of the filter assembly according to the present invention is as follows:

Assume that the collar 42 is in its lower or unclamped position. The filter unit or cartridge 58 is manually held in an upright fashion and the upper end thereof inserted into the collar 42 with the ridges 78 passing through the open spaces between the ends of the ledge formations 50 as seen in FIG. 4. The cartridge 58 is then rotated in either direction relative to the collar 42 and slightly lowered for locating the ridge formations 78 in the recesses 52 of the ledges as seen in the right hand portion of FIG. 3.

The collar 42 is rotated to its upper or clamped position. This causes lifting of the unit 58 resulting in capturing of the ridge formations 78 between the recess surfaces 52 and the surfaces 41 on the head part 26 thereby snugly securing the filter unit in place. When this occurs, the smaller annular portion 62 and the larger annular portion 63 of the closure member 60 will be in sealing engagement with respective bores 22 and 24 as seen in the left hand portion of FIG. 3. The fluid to be filtered is admitted to the cartridge 58 by rotating the lever 18 to the horizontal position illustrated in FIGS. 1 and 2. As a safety feature, the lever 18 is provided with a formation 18a adapted to be abutted by a formation 42a on the clamping collar thereby preventing rotation of the latter to its unclamped position prior to lifting of the lever 18 which of course results in shutting off the flow of incoming liquid. This feature also prevents the serviceman from attempting to remove the filter cartridge 58 prior to shutting off the flow of fluid at the inlet port 12.

If for some reason the lever 18 is raised a distance sufficient only to permit clearance between the formations 18a and 42a resulting only in partially shutting off the incoming liquid under pressure, injury to the serviceman or damage to any part of the associated apparatus will not result. This is because the filter unit 58 cannot be readily separated from the clamping collar 42 until the latter is moved to its unclamped position. After the clamping ring 42 has been lowered just a short distance from the head 10, the sealing rings 70 and 72 separate from respective bores 22 and 24 thereby allowing loss of the liquid which will indicate to the serviceman that the lever 18 is not in the closed position. Under these circumstances, the cartridge 58 will not be blown from the collar 42 as the ridges 78 will still be received in the recesses 52 of the ledge formations 50, the stop surfaces 54 preventing further rotation. In order to release the filter unit 58, it will have to be moved axially upward before it can be further rotated to bring the ridge formations 78 in registry with the openings between the ends of the ledges 50 and moved therethrough.

Infrequent changing of the filter unit 58 can cause a situation wherein the sealing rings 70 and 72 after long standing in a compressed state become adhered to and difficult to remove from their respective bores 22 and 24, thereby preventing the filter unit 58 from readily disengaging from the head unit 10. For this reason, the cam surfaces 40a are provided on the lower edge of the part 26 so that clockwise rotation of the collar 42 in FIG. 1 will cause the ridge formation 78 on the filter unit 58 to engage the cam surfaces 40a and thereby forcibly drive the filter unit in a downward axial manner disengaging the sealing rings 70 and 72 and allowing the filter unit to follow the collar 42 to its downward unclamped position.

The collar 42 can readily be rotated in either direction by hand; the collar is provided with circumferentially spaced, axially extending ribs 42b to facilitate hand turning. The collar 42 may also be rotated in either direction by grasping the filter unit 58 as the ends of the ridge formations 78 will engage the ledge surfaces 53 or 54 to impart rotation to the collar 42.

Thus, it is apparent that this invention advantageously provides an easy to handle filter assembly having several important features. It provides in the overall aspect an assembly wherein a filter unit can be easily removed and replaced without the use of extra tools, without spillage and without danger to the serviceman. The shut-off valve on the head makes it unnecessary for the serviceman to go to a remote location to shut off the inlet water. Two safety features are provided. First, before the clamping collar can be rotated to permit disengagement of the pressure vessel from the head, the shut-off valve actuating member must be disengaged from the clamping member. At that time the valve is moved to a closed position. If, however, it is not entirely closed when the clamping collar is partially loosened, means are provided on the clamping collar to prevent complete release thereof thus preventing fluid pressure from blowing the pressure vessel from the head. This avoids possible injury to the serviceman or damage to equipment upon unclamping of the collar 42. The head and filter unit closure member also provide unique cooperating inlet and outlet ports. Fluid pressure can act only on a very small area and, therefore, the force tending to disengage the filter unit from the head is minimized.

While the invention has been shown in but one preferred form, it will be obvious to those skilled in the art it is not to be so limited. On the contrary, the invention is susceptible of various forms and modifications without departing from the spirit and scope of the invention as defined in the appended claims.

I claim:

1. A filter assembly comprising:
a head adapted to be fixedly mounted;
fluid inlet and outlet ports formed in said head;
first cam surfaces on said head;
a clamping collar having second cam surfaces engageable with said first cam surfaces and cooperating therewith so that rotation of said collar in one direction causes axial movement of said collar from a clamping to an unclamped position and rotation in an opposite direction returns said collar to a clamping position;
a pressure vessel having a filter element disposed therein;
means for supporting said pressure vessel in said clamping collar;
means associated with said pressure vessel defining fluid inlet and outlet openings to and from the filter element and arranged for communication with said fluid inlet and outlet ports in said head to permit fluid flow through the filter,
said means associated with said pressure vessel comprising a closure member in sealed engagement with the end of said pressure vessel;
a manually operated shut-off valve in said head operatively associated with said fluid inlet; and
interacting means on said shut-off valve and said clamping collar for restraining said clamping collar against rotation to an unclamped position.

2. In a filter assembly the combination comprising:
a head adapted to be fixedly mounted;
fluid inlet and outlet ports formed in said head;
a clamping collar operatively associated with said head for retaining a pressure vessel in said head;
cooperating means on said head and said clamping collar for moving said clamping collar between a clamping and an unclamped position on said head;
a manually operated shut-off valve in said head operatively associated with said fluid inlet; and
interacting means on said shut-off valve and said clamping collar for restraining said clamping collar against rotation to an unclamped position.

3. The combination of claim 2 wherein said shut-off valve includes an actuating lever for movement of said valve between an open and a closed position; and said interacting means includes a first formation on said actuating lever and a second formation on said clamping collar, said two formations being arranged for abutting engagement when said lever is in its open position to prevent rotation of said collar from its clamped to an unclamped position.

4. A filter assembly comprising:
a head adapted to be fixedly mounted;
fluid inlet and outlet ports formed in said head;
first cam surfaces on said head;
a clamping collar having second cam surfaces engageable with said first cam surfaces and cooperating therewith so that rotation of said collar in one direction causes axial movement of said collar from a clamping to an unclamped position and rotation in an opposite direction returns said collar to a clamping position;
a pressure vessel having a filter element disposed therein;
means for supporting said pressure vessel in said clamping collar;
means associated with said pressure vessel defining fluid inlet and outlet openings to and from the filter element and arranged for communication with said fluid inlet and outlet ports in said head to permit fluid flow through the filter;
said means associated with said pressure vessel comprising a closure member in sealed engagement with the end of said pressure vessel,
said means for supporting said pressure vessel in said clamping collar includes
a plurality of circumferentially spaced ledge surfaces formed on said clamping collar and
a plurality of circumferentially spaced ridge surfaces on said pressure vessel engageable with said ledge surfaces,
safety means for preventing fluid under pressure in the system in which the filter assembly is disposed from blowing said pressure vessel from said head in the event removal of the pressure vessel is attempted before shutting off the supply of fluid to the head,
said safety means comprising cooperating stationary stop means on said head and stop means on said clamping collar defining a predetermined limit of rotation of said clamping collar when removal of said pressure vessel from the filter assembly is desired and further comprising said circumferentially spaced ledge surfaces on said clamping collar which in cooperation with said ridge surfaces on said pressure vessel are effective during initial disengagement of said pressure vessel from said head to prevent the pressure vessel being blown from said head.

5. In a filter assembly the combination comprising:
a head adapted to be fixedly mounted;
fluid inlet and outlet ports formed in said head;
a pressure vessel inserted in said head and adapted to have a filter element disposed therein;
means associated with said pressure vessel defining fluid inlet and outlet openings to and from the filter element and arranged for communication with said fluid inlet and outlet ports in said head to permit fluid flow through the filter;
a clamping collar for securing said pressure vessel into said head;

safety means for preventing fluid under pressure in the system in which the filter assembly is disposed from blowing said pressure vessel from said head in the event removal of the pressure vessel is attempted before shutting off the supply of fluid to the head;

said safety means comprising cooperating ledge surfaces and ridge surfaces on said clamping collar and pressure vessel, respectively, and cooperating stationary stop means on said head and stop means on said clamping collar defining a predetermined limit of rotation of the clamping collar when removal of the pressure vessel from the filter assembly is desired.

6. In a filter assembly the combination comprising:

a head adapted to be fixedly mounted;

fluid inlet and outlet ports formed in said head;

a filter unit inserted into said head;

a clamping collar for securing said filter unit in said head;

said filter unit comprising a pressure vessel adapted to have a filter element disposed therein and a closure member in sealed relationship with the open end of said pressure vessel, said closure member including an annular rim portion and first and second tubular portions, said three portions all being coaxially disposed;

a web portion interconnecting said rim portion and said second tubular portion;

said second tubular portion extending axially beyond said rim portion and said first tubular portion extending axially beyond said second tubular portion;

said first and second tubular portions being radially spaced from each other to define an opening therebetween;

said first tubular portion also defining an opening therethrough;

said openings defining fluid inlet and outlet ports to lead to and from the pressure vessel and adapted for fluid communication with said fluid inlet and outlet ports formed in said head.

7. In a filter unit for use in a filter assembly the combination comprising:

a pressure vessel adapted to have a filter element disposed therein;

a closure member in sealed relationship with the open end of said pressure vessel, said closure member comprising an annular substantially conical shaped body and including an annular rim portion and first and second tubular portions;

said three portions all being coaxially disposed;

a web portion interconnecting said rim portion and said second tubular portion;

said second tubular portion extending axially beyond said rim portion, and said first tubular portion extending axially beyond said second tubular portion;

said first and second tubular portions being radially spaced from each other to define an opening therebetween;

said first tubular portion also defining an opening therethrough;

said openings defining fluid inlet and outlet ports to lead to and from the pressure vessel.

8. The combination of claim 7 including means on each of said tubular portions for supporting sealing means thereon.

9. The combination of claim 7 including sealing means associated with the outside surface of each of said tubular portions, said tubular portions thereby being adapted to be placed in sealing engagement with inlet and outlet means of a head member disposed in the system with which the filter assembly is to be used.

10. The combination of claim 7 including a filter element within said pressure vessel and arranged therein to cooperate with the inlet and outlet ports of said closure member.

11. A filter unit closure member comprising:

an annular substantially conical shaped body including an annular rim portion and first and second tubular portions, said three portions all being coaxially disposed;

a web portion interconnecting said rim portion and said second tubular portion;

said second tubular portion extending axially beyond said rim portion and said first tubular portion extending axially beyond said second tubular portion;

said first and second tubular portions being radially spaced from each other to define an opening therebetween, said first tubular portion also defining an opening therethrough, said openings defining fluid inlet and outlet ports to lead to and from a filter unit with which said closure member is adapted to be associated.

12. The closure member of claim 11 including means on each of said tubular portions for supporting sealing means thereon.

* * * * *